(No Model.)
W. C. FREEMAN.
Stove Pipe.
No. 228,883.  Patented June 15, 1880.
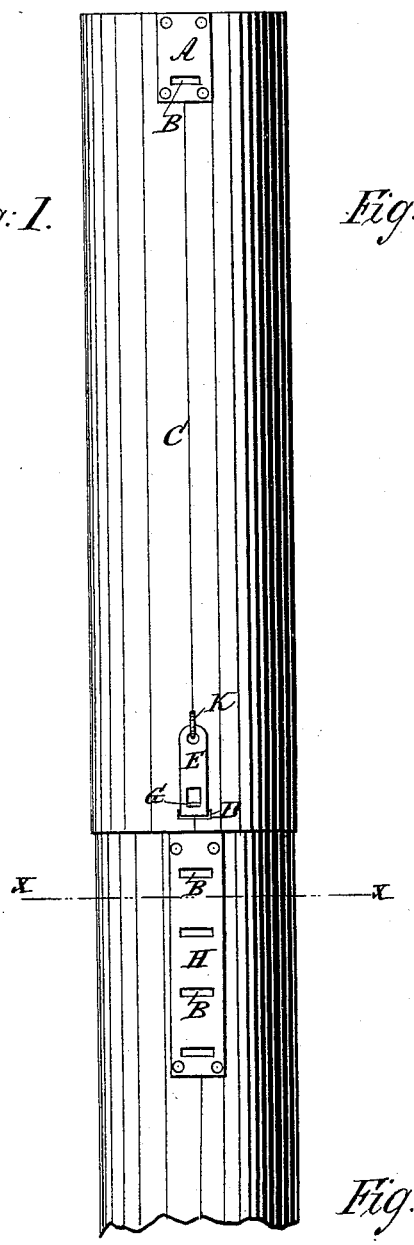
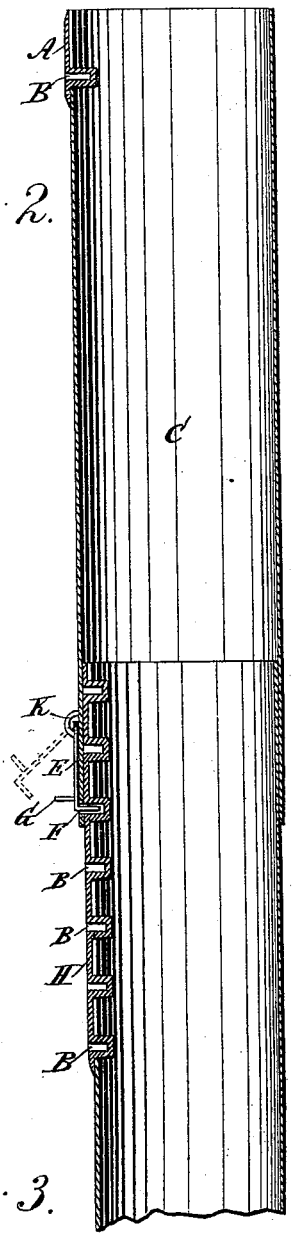
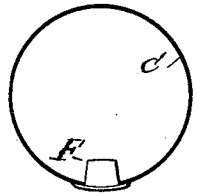
WITNESSES:
A. Schehl.
C. Sedgwick.
INVENTOR:
W. C. Freeman
BY Munn & Co.
ATTORNEYS.
N. PETERS, PHOTO-LITHOGRAPHER, WASHINGTON, D. C.

UNITED STATES PATENT OFFICE.

WALLACE C. FREEMAN, OF FORT RENO, INDIAN TERRITORY.

STOVE-PIPE.

SPECIFICATION forming part of Letters Patent No. 228,883, dated June 15, 1880.

Application filed March 24, 1880. (No model.)

*To all whom it may concern:*

Be it known that I, WALLACE C. FREEMAN, of Fort Reno, Indian Territory, have invented a new and useful Improvement in Stove-Pipes, of which the following is a specification.

The object of my invention is to provide an improvement in stove-pipes which is simple, permits adjusting the pipes to any desired length, and holds them firmly together, preventing telescoping of the same.

Lengths of stove-pipe have been provided with a series of crimps or indentations contiguous to one end thereof for the purpose of forming teeth or their equivalent, and adapted for engagement with a spring-dog attached to the adjacent end of the next length of pipe, whereby the two lengths may be locked together, so as to prevent telescoping or accidental separation.

My invention is an improvement in this line; and it consists in providing a cast-metal plate with a series of sockets and in attaching it to a stove-pipe length having a series of slots corresponding in number to said sockets, which latter enter the slots. The sockets may be of any depth required to receive the tooth of a dog which is hinged to the adjacent length of pipe, so that the parts may be firmly locked together and not be liable to accidental detachment.

In the accompanying drawings, Figure 1 is a front elevation of a stove-pipe provided with my improvement. Fig. 2 is a cross-sectional elevation of the same, and Fig. 3 is a horizontal sectional view taken on line X X.

Similar letters of reference indicate corresponding parts.

A plate, A, provided with a transverse recess, B, and having its outer surface rounded on the same diameter as that of the pipe C, is riveted to said pipe in such a manner that its outer rounded surface is entirely or almost flush with the outer surface of the pipe C. The other end of the pipe-section is provided with a transverse slot, D, of the same size and width as the recess B, and above this slot a tongue, E, provided with an angular projection, F, at the end, and with a projecting stud or thumb-piece, G, is hinged to the pipe C by means of a staple, K.

The plate may be made with several transverse recesses, B B, above each other, as shown in the plate H.

Preferably a small plate, A, will be attached to the ends of the ordinary pipe-sections; but a larger plate will be attached to the first section above an elbow or other curve, so as to permit the adjustment of the pipe between the curves without cutting off any parts.

The pipes are passed into each other in such a manner that the end provided with the plate is covered by the end with the slot and tongue. The pipes are then turned until the slot D is exactly over the recess B, and the projection F of the tongue E is then passed through the slot and into the recess. The end pipes are passed into each other more or less, as may be necessary, and when the same are in the proper position the projection F is passed into the corresponding recess B of the long plate H.

In order to make the plates very light, if cast, they are not cast solid, but only with thin shells to form the recesses.

It is evident that the several sections of a stove-pipe can be connected in a simple manner by means of the above device, and also can be easily adjusted to such lengths as may be necessary.

The annular flange on the stove, into which the lowest end of the pipe fits, should be provided with a slot, into which the projection F of the tongue E could pass after having passed through the slot D, and would thus connect the stove-pipe firmly with the stove.

Having thus described my invention, I claim as new and desire to secure by Letters Patent—

1. The combination, with the pipe having a series of transverse slots, of the oblong plate H, provided with a corresponding series of sockets projecting from its under side, said plate being attached to the pipe so that the sockets enter the slots thereof, as shown and described.

2. The combination of the angular tongue E F and the pipe-section C, having slot D, with the joining pipe-section having a series of transverse slots, and the oblong plate or casting H, having a series of sockets projecting from its under side, and said plate being attached to the pipe so that the sockets enter the slots thereof, as shown and described.

WALLACE C. FREEMAN.

Witnesses:
H. HAUSER,
WILLIS W. HALL, M. D.